(12) United States Patent
Koie

(10) Patent No.: US 7,908,050 B2
(45) Date of Patent: Mar. 15, 2011

(54) IN-VEHICLE EMERGENCY COMMUNICATOR

(75) Inventor: Yoshio Koie, Handa (JP)

(73) Assignee: Denso Corporation, Kariya (JP)

( * ) Notice: Subject to any disclaimer, the term of this patent is extended or adjusted under 35 U.S.C. 154(b) by 709 days.

(21) Appl. No.: 11/472,265

(22) Filed: Jun. 21, 2006

(65) Prior Publication Data

US 2006/0293812 A1    Dec. 28, 2006

(30) Foreign Application Priority Data

Jun. 24, 2005  (JP) ................................. 2005-184830

(51) Int. Cl.
*G06F 19/00* (2006.01)
(52) U.S. Cl. ...................... 701/29; 340/425.5
(58) Field of Classification Search ................. 701/29; 180/167; 340/438
See application file for complete search history.

(56) References Cited

U.S. PATENT DOCUMENTS

| | | | | |
|---|---|---|---|---|
| 5,815,822 | A  * | 9/1998 | Iu | 455/420 |
| 5,864,297 | A  * | 1/1999 | Sollestre et al. | 340/5.23 |
| 6,223,852 | B1 * | 5/2001 | Mukai et al. | 180/446 |
| 6,529,808 | B1 * | 3/2003 | Diem | 701/29 |
| 6,678,612 | B1 * | 1/2004 | Khawam | 701/213 |
| 6,839,614 | B1 * | 1/2005 | Timko et al. | 701/1 |
| 6,977,582 | B2 * | 12/2005 | Ota et al. | 340/457.1 |
| 7,174,243 | B1 * | 2/2007 | Lightner et al. | 701/33 |
| 2001/0052861 | A1 * | 12/2001 | Ohmura et al. | 340/988 |
| 2004/0035469 | A1 * | 2/2004 | Suzuki | 137/552 |
| 2004/0159479 | A1 * | 8/2004 | Morimoto et al. | 180/65.3 |
| 2005/0273214 | A1 * | 12/2005 | Koike | 701/1 |
| 2006/0253252 | A1 * | 11/2006 | Hamrick et al. | 701/213 |

FOREIGN PATENT DOCUMENTS

| | | |
|---|---|---|
| JP | 03-007627 | 1/1991 |
| JP | 2000-006736 | 1/2000 |
| JP | 2000-043675 | 2/2000 |
| JP | 2002-029364 | 1/2002 |
| JP | 2003-293914 | 10/2003 |
| JP | 2005-090138 | 4/2005 |

OTHER PUBLICATIONS

U.S. Appl. No. 11/901,930, filed Sep. 19, 2007, Sakai.
Office Action mailed Jun. 9, 2009 in a corresponding Japanese application No. 2005-184830 with English translation.

* cited by examiner

*Primary Examiner* — Khoi Tran
*Assistant Examiner* — Rodney King
(74) *Attorney, Agent, or Firm* — Harness, Dickey & Pierce, PLC

(57) ABSTRACT

An in-vehicle emergency communicator for a vehicle with an external device is disclosed. The communicator includes a travel state information receiver for receiving travel state information from the external device. The communicator also includes a transmitter for transmitting an emergency message signal, which includes the travel state information, to a service center. The communicator includes a controller for performing an emergency message operation, in which the transmitter transmits the emergency message signal when an emergency message trigger signal is inputted and an ignition signal from an ignition switch is in an ON-state. The controller analyzes the travel state information when the ignition signal from the ignition switch is in an OFF-state to determine whether the ignition signal is out of order. When it is detected that the ignition signal is out of order, the controller causes an indicator to indicate that the ignition signal is out of order.

15 Claims, 3 Drawing Sheets

IN-VEHICLE EMERGENCY COMMUNICATOR

CROSS-REFERENCE TO RELATED APPLICATION

This application is based on and claims priority to Japanese Patent Application No. 2005-184830, filed on Jun. 24, 2005, the disclosure of which is incorporated herein by reference.

FIELD OF THE INVENTION

The present invention relates to a communicator and, more particularly, relates to an in-vehicle emergency communicator.

BACKGROUND

Vehicle emergency communicators have been proposed for completing an emergency message operation. The emergency message operation involves transmitting an emergency message signal to a service center in the event of an emergency, e.g., detected by the deployment/inflation of an air bag. However, the air bag deployment signal may not be determined or transmitted when the ignition signal from the ignition switch is in an OFF-state. In other words, many vehicle emergency communicators of the prior art are constructed to determine and transmit the air bag deployment signal only when the ignition signal from the ignition switch is in an ON-state. However, when the ignition signal is out of order due to a broken wire, etc., the emergency communicator is unlikely to determine and transmit the air bag deployment signal, and the emergency message operation cannot be performed.

On the other hand, JP-A-2002-29364 describes a device with a plurality of transmission paths for the ignition signal. The technology described in JP-A-2002-29364 can be applied to an in-vehicle emergency communicator. As such, even if one of the transmission paths for the ignition signal fails, the emergency message operation can be appropriately performed using another transmission path. However, because the device includes a plurality of transmission paths for the ignition signal and also exclusive circuits thereto, the size of the device may be undesirably large, and/or the device may be more expensive.

SUMMARY OF THE INVENTION

An in-vehicle emergency communicator for a vehicle with an external device is disclosed. The communicator includes a travel state information receiver for receiving travel state information regarding a travel state of the vehicle from the external device. The communicator also includes a transmitter for transmitting an emergency message signal, which includes the travel state information, to a service center. Furthermore, the communicator includes a controller for performing an emergency message operation, in which the transmitter transmits the emergency message signal to the service center when an emergency message trigger signal is inputted and an ignition signal from an ignition switch is in an ON-state. The controller analyzes the travel state information when the ignition signal from the ignition switch is in an OFF-state to determine whether the ignition signal is out of order. Also, when it is detected that the ignition signal is out of order, the controller causes an indicator to indicate that the ignition signal is out of order.

BRIEF DESCRIPTION OF THE DRAWINGS

Other objects, features, and advantages will become more apparent from the following detailed description made with reference to the accompanying drawings, in which like parts are designated by like reference numbers and in which.

DETAILED DESCRIPTION OF THE PREFERRED EMBODIMENTS

First Embodiment

Figure 1:
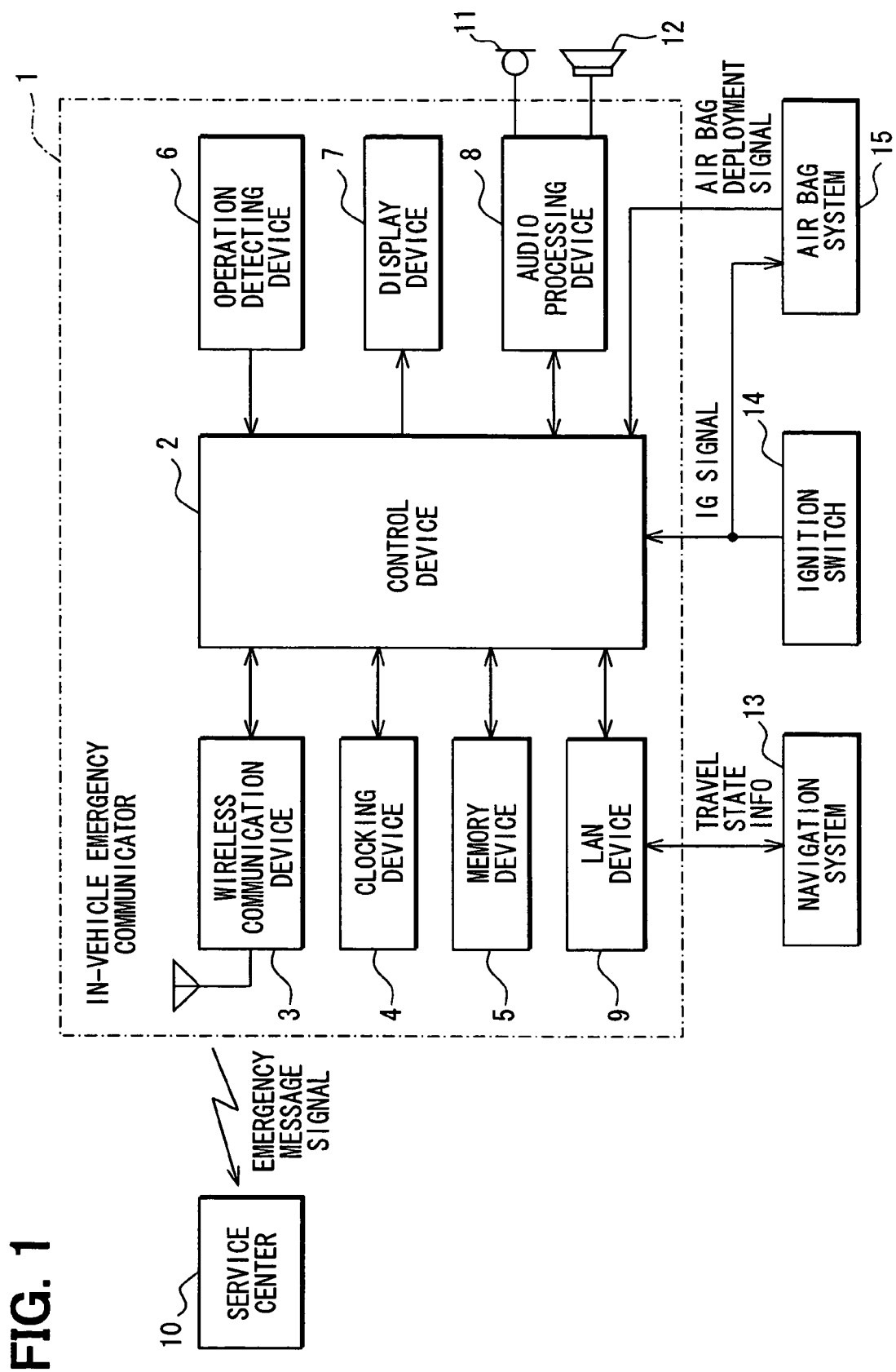
FIG. 1 is a functional block diagram showing one embodiment of an in-vehicle emergency communicator.
Figure 2:
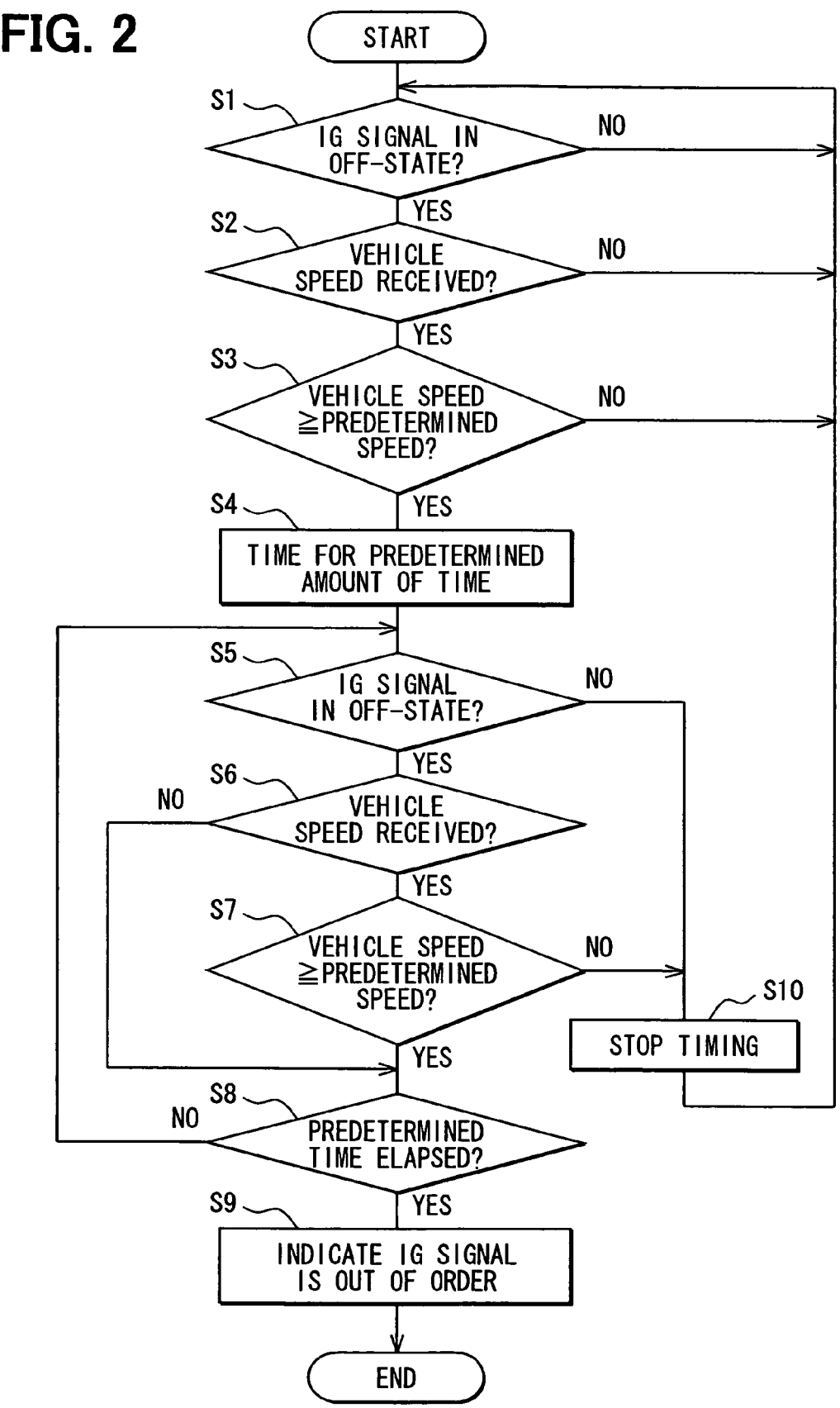
FIG. 2 is a flow chart showing control of the in-vehicle emergency communicator of FIG. 1.

A first embodiment of the present invention will be hereinafter explained with reference to FIGS. 1 and 2. FIG. 1 is a functional block diagram showing an in-vehicle emergency communicator 1. The in-vehicle emergency communicator 1 is provided with a control device 2 (i.e., a controller), a wireless communication device 3 (i.e., a transmitter), a clock device 4, a memory device 5, an operation detecting device 6, a display device 7 (i.e., an indicator), an audio processing device 8, and a LAN transmitting/receiving device 9 (i.e., a travel state information receiver). It will be appreciated that the in-vehicle emergency communicator 1 may be of a module structure.

The control device 2 is formed mainly of a CPU and controls substantially all of the operations of the in-vehicle emergency communicator 1. When the wireless communication device 3 receives an input of an emergency message command signal from the controller 2, the wireless communication device 3 wirelessly transmits an emergency message signal to a service center 10. The emergency message signal can include any suitable information, including but not limited to an identification code for identifying the in-vehicle emergency communicator 1, latitude and longitude for showing a vehicle position, a vehicle speed, and a vehicle traveling distance.

The clocking device 4 performs a timing operation when a clocking command signal is input from the control device 2. The memory device 5 stores various information in memory. The operation detecting device 6 outputs an operation detecting signal to the control device 2 when it detects that a user operates an emergency message button. The display device 7 displays information in accordance with a display command signal input from the control device 2. The audio processing device 8 performs audio processing of sound inputted to a microphone 11 and sound outputted from a speaker 12. In one embodiment, the in-vehicle emergency communicator 1 transmits the emergency message signal to the service center 10, and a communication circuit is established between the in-vehicle emergency communicator 1 and the service center 10. Then, a user can converse with an operator located at the service center 10 using the microphone 11 and the speaker 12. Accordingly, the user can request assistance, report an accident, or the like.

In the embodiment shown, the LAN transmitting/receiving device 9 has an interface function with an in-vehicle LAN and transmits/receives various pieces of information to/from a navigation system 13. In one embodiment, the navigation system 13 detects vehicle travel state information such as the vehicle position expressed in latitude and longitude coordinates, the vehicle speed, and the vehicle traveling distance. Also, the navigation system 13 communicates the vehicle travel state information to the in-vehicle emergency communicator 1 via the in-vehicle LAN 9. Using the wireless communication device 3, the control device 2 transmits the emergency message signal, which includes the vehicle travel state information, to the service center 10. Thus, the service center 10 is informed of the emergency situation as well as the latitude and longitude coordinates of the vehicle, the vehicle speed, the vehicle traveling distance, and/or any other vehicle travel state information.

An ignition switch 14 outputs an ignition signal to the control device 2 and an air bag system 15. When the air bag is deployed, the air bag system 15 outputs an air bag deploying signal (i.e., an emergency message trigger signal) to the control device 2 when the ignition signal inputted from the ignition switch 14 is in an ON-state.

As will be discussed in greater detail below, the emergency communicator 1 performs an emergency message operation and transmits the emergency message signal when the emergency message trigger signal is initiated. The emergency message trigger signal can be initiated in any suitable manner, such as a manual input from the user using a button of the operating detecting device 6 and/or an output of the air bag deploying signal from the air bag system 15.

Next, operations of the above-mentioned structure will be explained with reference to FIG. 2.

Beginning in step S1, the control device 2 detects whether the ignition signal input from the ignition switch 14 is in an OFF-state. If the OFF-state is detected, step S2 follows, and the control device 2 determines whether the vehicle speed signal is received from the navigation system 13. If the vehicle speed is received, step S3 follows, and the control device 2 determines whether the vehicle speed is greater than or equal to a predetermined speed.

If the vehicle speed is greater than or equal to the predetermined speed, step S4 follows, and the control device 2 causes the clocking device 4 to start timing for a predetermined time. Step S4 ensures that a predetermined delay occurs before the next step, S5, occurs.

In step S5, it is again detected whether the ignition signal from the ignition switch 14 is in an OFF-state. If the OFF-state is detected in step S5, step S6 follows, and the control device 2 determines again whether the vehicle speed is received from the navigation system 13. If the vehicle speed is being received, step S7 follows, and the control device 2 determines again whether the vehicle speed is greater than or equal to a predetermined speed. If the vehicle speed is greater than or equal to the predetermined speed, step S8 follows, and it is determined whether a predetermined time has elapsed. Accordingly, steps S7 and S8 ensure that the vehicle speed is greater than or equal to the predetermined speed for a predetermined amount of time.

If it is detected in step S8 that the predetermined time has elapsed, step S9 follows, and the control device 2 causes the display device 7 to indicate that the ignition signal is out of order. The display device 7 can indicate the malfunction in any suitable manner. For instance, in one embodiment, a text message, such as "an ignition signal is out of order," is displayed to the user. In another embodiment, the display device 7 indicates the malfunction with sound.

On the other hand, when a negative determination is made in step S5 (i.e., when the control device 2 detects that the ignition signal inputted from the ignition switch 14 is switched from the OFF-state to the ON-state before the predetermined time elapses) or a negative determination is made at step S7 (i.e., the vehicle speed is less than the predetermined speed), step S10 follows. In step S10, the control device 2 stops the timing by the clocking device 4, and the process returns to step S1.

According to the process described above, when the ignition signal is in an OFF-state and the vehicle speed is greater than or equal to the predetermined speed for the predetermined time, the display device 7 indicates the malfunction. The display device 7 indicates that the ignition signal is out of order. Therefore, the user becomes aware that the ignition signal is out of order.

In one embodiment, the predetermined vehicle speed of the procedure is approximately twenty (20) kilometers per hour. Also, in one embodiment, the predetermined time of the process is approximately ten (10) seconds.

Furthermore, according to the embodiment explained above, in the in-vehicle emergency communicator 1, the control device 2 determines whether, when the ignition signal from the ignition switch 14 is in an OFF-state, the vehicle speed is more than a predetermined speed for a predetermined time to thereby determine whether the ignition signal is out of order. If the malfunction of the ignition signal is detected, the display device 7 indicates that the ignition signal is out of order.

Accordingly, the vehicle speed included in the emergency message signal is used as the determination reference to determine whether the ignition signal is out of order. Therefore, unlike the prior art there is little need for a plurality of transmission paths for the ignition signal and/or an exclusive circuit. As a result, the communicator 1 can be more compact and simpler, and the communicator 1 can be less expensive. However, it is possible to appropriately determine whether the ignition signal is out of order. Further, a user can be appropriately informed that the ignition signal is out of order, thus improving user awareness. In addition, in this embodiment the controller 2 does not determine an accumulated physical quantity. Therefore, the communicator 1 is less likely to be detrimentally affected by noise.

Second Embodiment

A second embodiment will be explained with reference to FIG. 3. It is noted that an explanation for components identical to those in the first embodiment is omitted, but components different from those in the first embodiment are explained below. In the first embodiment as described above, it is determined whether or not the ignition signal is out of order based upon travel information (i.e., vehicle speed) received from the navigation system 13. On the other hand, in the second embodiment, it is determined whether or not an ignition signal is out of order based upon a vehicle traveling distance received from the navigation system 13.

Figure 3:
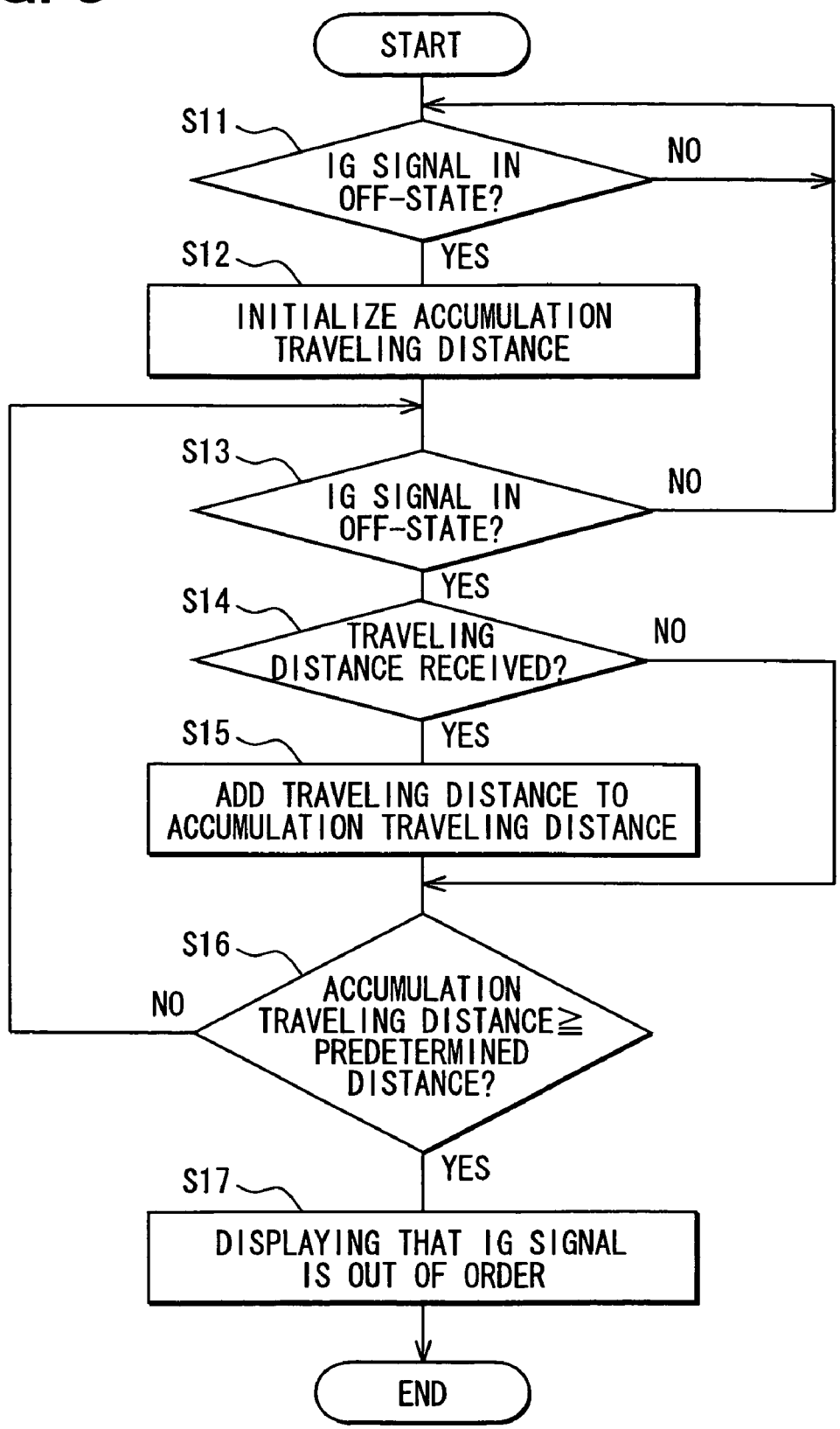
FIG. 3 is a flow chart showing another embodiment of control of the in-vehicle emergency communicator.

More specifically, referring to FIG. 3, the procedure begins in step S11, in which the control device 2 detects whether the ignition switch 14 is in an OFF-state. If the ignition switch 14 is in an OFF-state, step S12 follows, and the control device 2 initializes an accumulation traveling distance. Then, in step S13, the control device 2 detects that the ignition signal inputted from the ignition switch 14 is in an OFF-state. If the OFF-state is detected, step S14 follows, and the control device 2 determines whether a traveling distance is received as travel state information from the navigation system 13.

If traveling distance is received, step S15 follows, and the traveling distance is added to the accumulation traveling distance. Next, in step S16, the control device 2 determines whether the accumulation traveling distance is greater than or equal to a predetermined distance. In one embodiment, the predetermined distance is several meters.

When the control device 2 detects that the accumulation traveling distance is greater than or equal to the predetermined distance, step S17 follows, and the control device 2 causes the display device 7 to indicate that the ignition signal is out of order. On the other hand, if the control device 2 detects that the ignition signal inputted from the ignition switch 14 is switched from the OFF-state to the ON-state before the accumulation traveling distance is greater than or equal to the predetermined distance (i.e., a negative determination at step S13), the process returns to step S 11.

Accordingly, when the ignition signal is an OFF-state, if the accumulation traveling distance obtained by accumulating the vehicle traveling distance received from the navigation system 13 is greater than or equal to the predetermined distance, the display device 7 indicates that the ignition signal is out of order. Therefore, a user can recognize that the ignition signal is out of order.

According to the second embodiment as explained above, the control device 2 determines (when the ignition signal from the ignition switch 14 is in an OFF-state) whether the accumulation traveling distance is greater than or equal to the predetermined distance, thereby determining whether or not the ignition signal is out of order. Then, when the control device 2 detects that the ignition signal is out of order, the display device 7 indicates that the ignition signal is out of order.

Thus, to determine whether the ignition signal is out of order, the traveling distance included originally in the emergency message signal is used as a determination reference. Therefore, unlike the prior art there is little need for a plurality of transmission paths for the ignition signal and/or an exclusive circuit. As a result, the communicator 1 can be more compact and simpler, and the communicator 1 can be less expensive. However, it is possible to appropriately determine whether the ignition signal is out of order. Further, a user can be appropriately informed that the ignition signal is out of order, thus improving user awareness.

Other Embodiments

The present invention is not limited to the above-mentioned embodiments. For instance, the embodiments described above can be modified as follows.

The communicator 1 can include a device formed of a component of the navigation system. The display device 7 can be of any suitable type, such as a visual indicator (e.g., a blinking red LED), an audio indicator, or the like.

Also, the system for outputting the trigger signal for emergency message start to the in-vehicle emergency communicator 1 may be another system other than the air bag system 15.

While only the selected preferred embodiments have been chosen to illustrate the present invention, it will be apparent to those skilled in the art from this disclosure that various changes and modifications can be made therein without departing from the scope of the invention as defined in the appended claims. Furthermore, the foregoing description of the preferred embodiments according to the present invention is provided for illustration only, and not for the purpose of limiting the invention as defined by the appended claims and their equivalents.

What is claimed is:

1. An in-vehicle emergency communicator for a vehicle with an external device comprising:
    a travel state information receiver for receiving travel state information regarding a travel state of the vehicle from the external device;
    a transmitter for transmitting an emergency message signal, which includes the travel state information, to a service center; and
    a controller for performing an emergency message operation, in which the transmitter transmits the emergency message signal to the service center when an emergency message trigger signal is inputted and an ignition signal from an ignition switch is in an ON-state, wherein:
    the controller analyzes the travel state information when the ignition signal from the ignition switch is in an OFF-state to determine whether the ignition signal has malfunctioned;
    when it is detected that the ignition signal has malfunctioned, the controller causes an indicator to indicate that the ignition signal has malfunctioned;
    the travel state information receiver receives vehicle travel speed information from the external device; and
    the controller determines whether, when the ignition signal from the ignition switch is in the OFF-state, the vehicle travel speed is greater than a predetermined speed for a predetermined time to thereby determine whether the ignition signal has malfunctioned.

2. The in-vehicle emergency communicator according to claim 1, wherein
    when it is detected that the ignition signal has malfunctioned, the controller causes at least one of a visual indicator and an audio indicator, as the indicator, to indicate that the ignition signal has malfunctioned.

3. An in-vehicle emergency communicator for a vehicle with an external device comprising:
    a travel state information receiver for receiving travel state information regarding a travel state of the vehicle from the external device;
    a transmitter for transmitting an emergency message signal, which includes the travel state information, to a service center; and
    a controller for performing an emergency message operation, in which the transmitter transmits the emergency message signal to the service center when an emergency message trigger signal is inputted and an ignition signal from an ignition switch is in an ON-state, wherein:
    the controller analyzes the travel state information when the ignition signal from the ignition switch is in an OFF-state to determine whether the ignition signal has malfunctioned;
    when it is detected that the ignition signal has malfunctioned, the controller causes an indicator to indicate that the ignition signal has malfunctioned;
    the travel state information receiver receives traveling distance information from the external device; and
    the controller determines whether, when the ignition signal from the ignition switch is in the OFF-state, the vehicle traveling distance is more than a predetermined distance to thereby determine whether the ignition signal has malfunctioned.

4. The in-vehicle emergency communicator according to claim 3, wherein
    when it is detected that the ignition signal has malfunctioned, the controller causes at least one of a visual indicator and an audio indicator, as the indicator, to indicate that the ignition signal has malfunctioned.

5. An in-vehicle emergency communicator for a vehicle with an external device comprising:
    a travel state information receiver for receiving travel state information regarding a travel state of the vehicle from the external device;
    a transmitter for transmitting an emergency message signal, which includes the travel state information, to a service center; and
    a controller for performing an emergency message operation, in which the transmitter transmits the emergency message signal to the service center when an emergency message trigger signal is inputted and an ignition signal from an ignition switch is in an ON-state, wherein:

the controller is configured to
(i) determine, when the ignition signal from the ignition switch is in an OFF-state, whether the ignition signal has malfunctioned by determining whether, although the ignition signal from the ignition switch is in the OFF-state, the vehicle is traveling; and
(ii) cause an indicator to indicate that the ignition signal has malfunctioned when it is determined that the ignition signal has malfunctioned, wherein: the travel state information receiver receives vehicle travel speed information from the external device; and the controller determines whether, when the ignition signal from the ignition switch in of the OFF-state, the vehicle travel speed is greater than a predetermined time to thereby determine whether the ignition signal has malfunctioned.

6. The in-vehicle emergency communicator according to claim 5,
the controller being further configured to stop the determining whether the ignition signal has malfunctioned,
(i) when the ignition signal is switched from the OFF-state to the ON-state while determining whether the vehicle travel speed is greater than the predetermined speed for the predetermined time when the ignition switch is in the OFF-state, or
(ii) when the vehicle travel speed becomes equal to or less than the predetermined speed for the predetermined time while determining whether the vehicle travel speed is greater than the predetermined speed for the predetermined time when the ignition switch is in the OFF-state.

7. The in-vehicle emergency communicator according to claim 5, wherein:
the travel state information receiver receives traveling distance information from the external device; and
the controller determines whether, when the ignition signal from the ignition switch is in the OFF-state, the vehicle traveling distance is more than a predetermined distance to thereby determine whether the ignition signal has malfunctioned.

8. The in-vehicle emergency communicator according to claim 7,
the controller being further configured to stop the determining whether the ignition signal has malfunctioned when the ignition signal is switched from the OFF-state to the ON-state while determining whether the vehicle traveling distance is more than the predetermined distance when the ignition switch is in the OFF-state.

9. The in-vehicle emergency communicator according to claim 7, wherein
when it is detected that the ignition signal has malfunctioned, the controller causes at least one of a visual indicator and an audio indicator, as the indicator, to indicate that the ignition signal has malfunctioned.

10. The in-vehicle emergency communicator according to claim 5,
the controller being further configured to be connected with the ignition switch via a single transmission path to receive the ignition signal indicating either the ON-state or the OFF-state of the ignition switch, without being connected via a plurality of transmission paths to thereby anticipate failure in detecting the ignition signal.

11. The in-vehicle emergency communicator according to claim 5, wherein
when it is detected that the ignition signal has malfunctioned, the controller causes at least one of a visual indicator and an audio indicator, as the indicator, to indicate that the ignition signal has malfunctioned.

12. A method for determining whether an ignition signal from an ignition switch has malfunctioned for performing an emergency message operation for a vehicle when an emergency message trigger signal is inputted and the ignition signal is in an ON-state, the method comprising:
receiving travel state information regarding a travel state of the vehicle;
determining, when the ignition signal from the ignition switch is in an OFF-state, whether the vehicle is traveling by analyzing the received travel state information;
determining that the ignition signal has malfunctioned by determining that the vehicle is traveling although the ignition signal from the ignition switch is in the OFF-state; and
causing an indicator to indicate that the ignition signal has malfunctioned when it is determined that the ignition signal has malfunctioned; and receiving vehicle travel speed information of the vehicle from an external device; and determining whether, when the ignition signal from the ignition switch is in the OFF-state, the vehicle ravel speed is greater than a predetermined speed for a predetermined time to thereby determine whether the ignition signal has malfunctioned.

13. The method according to claim 12, further comprising:
receiving traveling distance information of the vehicle; and
determining whether, when the ignition signal from the ignition switch is in the OFF-state, the vehicle traveling distance is more than a predetermined distance to thereby determine whether the ignition signal has malfunctioned.

14. The method according to claim 13, wherein
the indicator, which is caused to indicate that the ignition signal has malfunctioned when it is determined that the ignition signal has malfunctioned, includes at least one of a visual indicator and an audio indicator.

15. The method according to claim 8, wherein
the indicator, which is caused to indicate that the ignition signal has malfunctioned when it is determined that the ignition signal has malfunctioned, includes at least one of a visual indicator and an audio indicator.

* * * * *